(12) United States Patent
Revelis et al.

(10) Patent No.: US 7,658,126 B2
(45) Date of Patent: *Feb. 9, 2010

(54) SAFETY RELEASE FEATURE

(75) Inventors: Peter Revelis, Newmarket (CA); Michael Sykes, Orangeville (CA); Dusit Sukonthapanich, Newmarket (CA)

(73) Assignee: Ventra Group, Inc., Ontario (CA)

( * ) Notice: Subject to any disclaimer, the term of this patent is extended or adjusted under 35 U.S.C. 154(b) by 798 days.

This patent is subject to a terminal disclaimer.

(21) Appl. No.: 11/132,253

(22) Filed: May 19, 2005

(65) Prior Publication Data

US 2005/0211009 A1 Sep. 29, 2005

Related U.S. Application Data

(63) Continuation-in-part of application No. 10/151,101, filed on May 21, 2002, now Pat. No. 7,021,174.

(60) Provisional application No. 60/293,213, filed on May 25, 2001.

(51) Int. Cl.
*F16C 1/12* (2006.01)
*G05G 5/06* (2006.01)

(52) U.S. Cl. ............... 74/535; 74/528; 74/537; 74/538; 74/501.5 R; 74/501.6

(58) Field of Classification Search ........... 74/512, 74/528, 523, 560, 567, 575, 577 M, 578, 74/529, 535, 536, 545, 501.6, 516; 188/2 D; *B60T 7/08*
See application file for complete search history.

(56) References Cited

U.S. PATENT DOCUMENTS

| | | | |
|---|---|---|---|
| 1,554,752 A | 9/1925 | Moses | |
| 2,377,690 A | 6/1945 | Jandus | |
| 2,405,956 A | 8/1946 | Jandus | |
| 3,216,276 A | 11/1965 | Nagy | |
| 3,298,245 A | 1/1967 | Cross | |
| 3,620,099 A | 11/1971 | Stotz | |
| 4,138,905 A | 2/1979 | Konishi | |
| 4,212,211 A | 7/1980 | Rickert | |
| 4,403,524 A | 9/1983 | Gurney | |
| 4,800,774 A * | 1/1989 | Hagiwara et al. | 74/512 |

(Continued)

FOREIGN PATENT DOCUMENTS

AU 756067 6/2003

(Continued)

*Primary Examiner*—Vinh T. Luong
(74) *Attorney, Agent, or Firm*—Pillsbury Winthrop Shaw Pittman LLP (57) ABSTRACT

A parking brake actuator for a vehicle includes a toothed stationary sector fixed to a mounting structure, a brake lever pivotably mounted to the sector, a pawl mounted to the brake lever for movement between engaged and disengaged positions relative to the teeth, an elongated, substantially rigid release member mounted to the brake lever for movement relative to the brake lever between normal and depressed positions, and a motion-absorbing member connecting the release member to the pawl. When the brake lever is operatively connected to the vehicle brake cable and in a braking position thereof with the pawl in the engaged position thereof, moving the release member to the depressed position thereof without also moving the brake lever in the brake applying direction compresses the motion-absorbing member without moving the pawl from the engaged position thereof.

34 Claims, 5 Drawing Sheets

U.S. PATENT DOCUMENTS

| | | | | |
|---|---|---|---|---|
| 4,819,501 A | * | 4/1989 | Kraus et al. | 74/538 |
| 4,876,914 A | | 10/1989 | Kanno | |
| 4,881,425 A | | 11/1989 | Kanno | |
| 5,001,942 A | * | 3/1991 | Boyer | 74/535 |
| 5,205,184 A | | 4/1993 | Noel et al. | |
| 5,816,111 A | | 10/1998 | Borchers | |
| 5,819,595 A | * | 10/1998 | Cebollero | 74/535 |
| 2003/0084743 A1 | * | 5/2003 | Djordjevic | 74/502.2 |
| 2007/0181386 A1 | * | 8/2007 | Revelis et al. | 188/2 D |

FOREIGN PATENT DOCUMENTS

| | | | |
|---|---|---|---|
| DE | 198 59 496 A1 | | 7/2000 |
| DE | 101 50 582 A1 | * | 5/2002 |
| EP | 0 474 328 | | 3/1992 |
| JP | 357186562 A | | 11/1982 |
| JP | 359023755 A | | 2/1984 |

\* cited by examiner

SAFETY RELEASE FEATURE

The present application is a continuation-in-part of U.S. application Ser. No. 10/151,101, filed May 21, 2002, now U.S. Pat. No. 7,021,174 which claims priority to U.S. Provisional Application of Peter Revelis et al., Application No. 60/293,213, filed May 25, 2001, each of which is hereby incorporated into the present application by reference.

FIELD OF THE INVENTION

The present invention relates to a parking brake actuating assembly for installation in a passenger compartment of a motor vehicle that has a brake system actuated by applying tension in a brake activating direction to a brake cable. More particularly, the present invention relates to a parking brake actuating assembly having an anti-release feature to prevent the parking brake from being erroneously released from its operative, brake applying position to its inoperative, brake releasing position.

BACKGROUND OF THE INVENTION

A parking brake actuating assembly is typically installed in a passenger compartment of a motor vehicle adjacent the driver's seat. The motor vehicle has a brake system that is actuated to prevent vehicle wheel rotation and hence rolling movement of the vehicle by applying tension to a vehicle brake cable that connects to the brake system.

The typical parking brake actuating assembly comprises a stationary sector having a plurality of teeth. A brake lever is mounted for pivotal movement relative to the sector and is adapted to be operatively connected to the vehicle brake cable. The brake lever is pivotable in a brake applying direction to a braking position to apply tension to the vehicle brake cable and in a brake releasing direction opposite the brake applying direction to a released position to release tension on the brake cable and release the vehicle brakes. A pawl is normally mounted to the brake lever for movement between engaged and disengaged positions relative to the sector teeth. When the pawl is in the engaged position and the brake lever is in the braking position, the pawl engages the teeth to prevent the brake lever from pivoting in the brake releasing direction. When pawl is in the disengaged position, the pawl disengages from the teeth to allow the brake lever to pivot from the braking position thereof towards and into the released position thereof. An elongated release member is mounted to the brake lever for longitudinal movement relative to the brake lever between normal and depressed positions. An activation button, which protrudes out of an outer end of the brake lever, is connected to an outer end of the release member. An inner end of the release member is connected to the pawl such that when the release member is moved into the depressed position, the pawl is forced into the disengaged position.

In this type of brake actuator assembly, the tension created in the brake cable system when the lever is in the brake applied position tends to force the pawl into a binding engagement with the sector teeth. To move the lever to its brake released position, the user first lifts the brake lever slightly in the brake applying direction to remove the cable tension load from the pawl and then depresses the activation button to disengage the pawl. It is possible for the brake lever to be released unintentionally if an impact force is applied to the button with a high enough force to overcome binding engagement created between the pawl and the sector teeth by the cable tension load. It is desirable to prevent the parking brake actuator from being unintentionally released by such an impact force.

U.S. Pat. No. 4,881,425 (hereinafter "the '425 patent") discloses a parking brake actuator designed to reduce the chances of such an unintentional release of the parking brake by positioning a motion-absorbing spring within the activation button in engagement with the end of the release member. When a user depresses the activation button, the spring compresses and transfers its stored energy to the release member, which urges the release member into its depressed position, in turn urging the pawl into its disengaged position. When the parking brake is in its brake applied position with the cable tension load binding the pawl with the sector teeth, depressing the activation button without lifting the lever in the brake applying direction simply compresses the spring without disengaging the pawl from the sector teeth. That is, the spring is sufficiently weak to allow the button to be depressed without overcoming the binding of the pawl with the sector teeth and moving the same into its disengaged position. If a user wishes to release the parking brake he must first lift the brake lever slightly, thereby reducing the cable tension load on the pawl and then depress the activation button to move the pawl into its disengaged position. Because it is unlikely that a user will unintentionally depress the activation button and rotate the brake lever in the brake applying direction, the likelihood of an unintended release of the parking brake is reduced.

The parking brake actuator disclosed in the '425 patent has several shortcomings. The spring disposed between the activation button and the release member is disposed at a narrow outer handle of the brake lever, which is designed to permit a user to wrap his hand around the brake lever. The required incorporation of the spring into such a small area complicates the manufacturing process because the spring must be coiled, inserted, and held in a very small space during assembly. It is also difficult to manufacture the small but intricate activation button.

Japanese Utility Model Laid-Open Publication No. JP357186562A discloses another parking brake actuator that reduces the likelihood of an erroneous release of the parking brake and operates in a similar manner as the actuator of the '425 patent. However, instead of using a motion-absorbing spring disposed between the activation button and the release member to provide the urging force, the actuator disclosed in the Japanese Publication utilizes a single flexible release member that elastically deforms to absorb the motion of the activation button when depressed. An available commercial version of the design disclosed in this Japanese application uses a flexible plastic rod for the release member. This brake actuator also suffers from a major shortcoming. Because the disclosed release member is constructed from a flexible material, the resulting release member tends to fatigue faster than would be the case with a rigid release member.

Consequently, there exists a need in the art for a parking brake actuator with an anti-release feature that eliminates the difficulties encountered by the above-described conventional devices.

SUMMARY OF THE INVENTION

It is therefore an object of the present invention to meet the above-described need. To achieve this object, the present invention provides a parking brake actuating assembly for installation in a passenger compartment of a motor vehicle having a brake system that is actuated to prevent vehicle wheel rotation and hence rolling movement of the vehicle by applying tension to a vehicle brake cable that connects to the brake system.

The parking brake actuating assembly comprises a stationary sector carried by a mounting structure of the vehicle and having a plurality of teeth. A brake lever mounted for pivotal movement relative to the sector is adapted to be operatively connected to the vehicle brake cable. The brake lever is pivotable (a) in a brake applying direction to a braking position to apply tension to the vehicle brake cable and (b) in a brake releasing direction opposite the brake applying direction to a released position. A pawl is mounted to the brake lever for movement between engaged and disengaged positions relative to the teeth. When the pawl is in the engaged position and the brake lever is in the braking position, the pawl engages the teeth to prevent the brake lever from pivoting in the brake releasing direction. When the pawl is in the disengaged position, it is disengaged from the teeth and allows the brake lever to pivot from the braking position thereof towards and into the released position thereof. An elongated, substantially rigid release member is mounted to the brake lever for longitudinal movement relative to the brake lever between normal and depressed positions. The release member includes an activation portion that extends exteriorly of the brake lever such that manually depressing the activation portion moves the release member from the normal position to the depressed position. A resilient motion-absorbing member spaced inwardly from the activation portion operatively connects the release member to the pawl. When the brake lever is operatively connected to the vehicle brake cable and moved to the braking position thereof with the pawl in the engaged position thereof, (a) moving the brake lever in the brake applying direction to relieve a cable tension load from the pawl and manually moving the release member to the depressed position thereof moves the pawl from the engaged position thereof to the disengaged position thereof via the motion-absorbing member, and (b) moving the release member to the depressed position thereof without also moving the brake lever in the brake applying direction to relieve the cable tension load compresses the motion-absorbing member without moving the pawl from the engaged position thereof.

Other objects, features, and advantages of the present invention will become apparent from the following detailed description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DESCRIPTION OF THE PREFERRED EMBODIMENT

Hereinafter, the brake actuator 10 according to the present invention will be described with respect to FIGS. 1 and 2.

Figure 1:
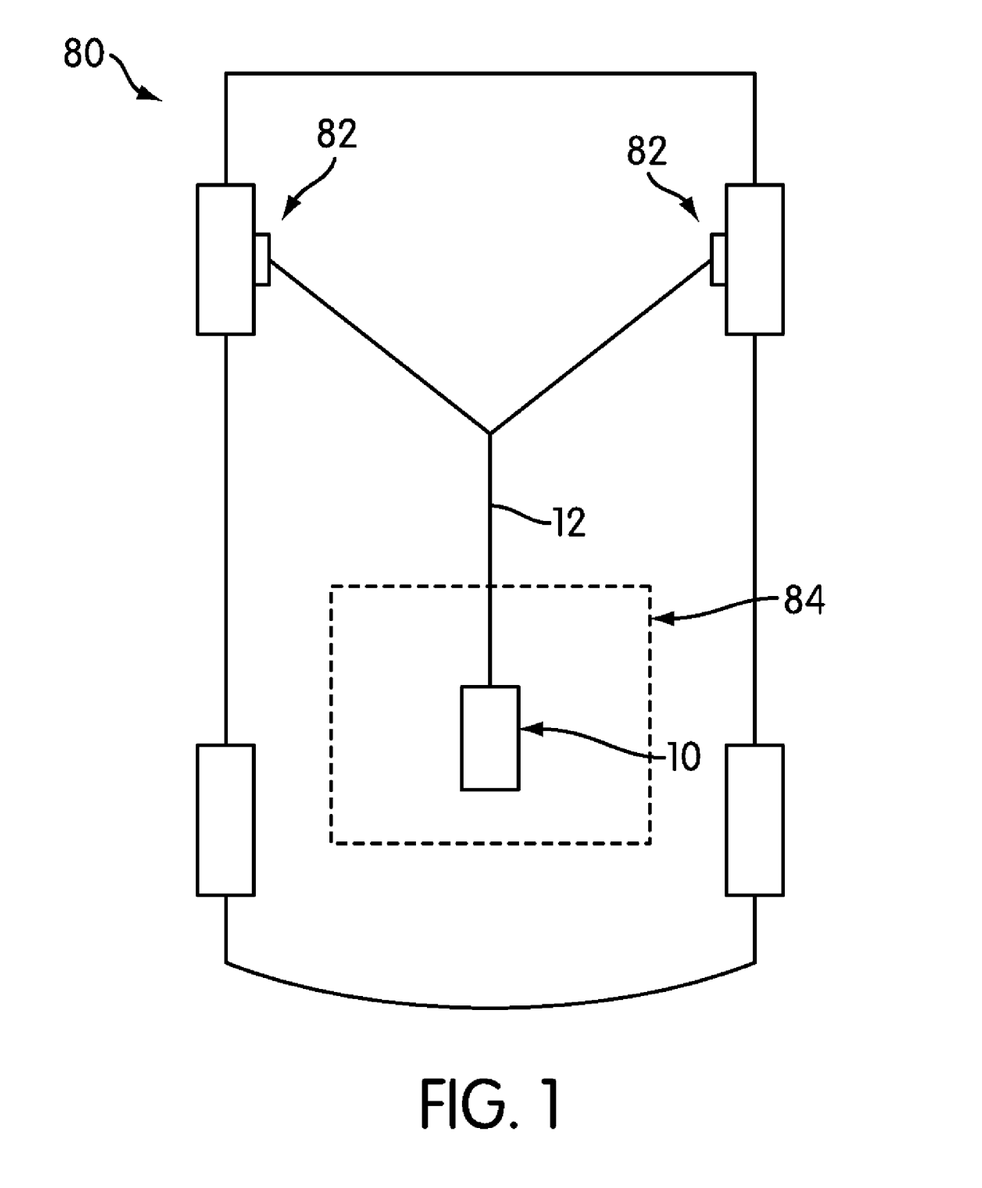
FIG. 1 is a schematic view of a vehicle having a parking brake actuating assembly constructed according to an embodiment of the present invention.

As shown in FIG. 1, a vehicle 80 has a braking system 82 that is actuated to prevent vehicle wheel rotation and hence rolling movement of the vehicle 80 by applying tension to a brake cable 12 that connects to the brake system 82.

Figure 2:
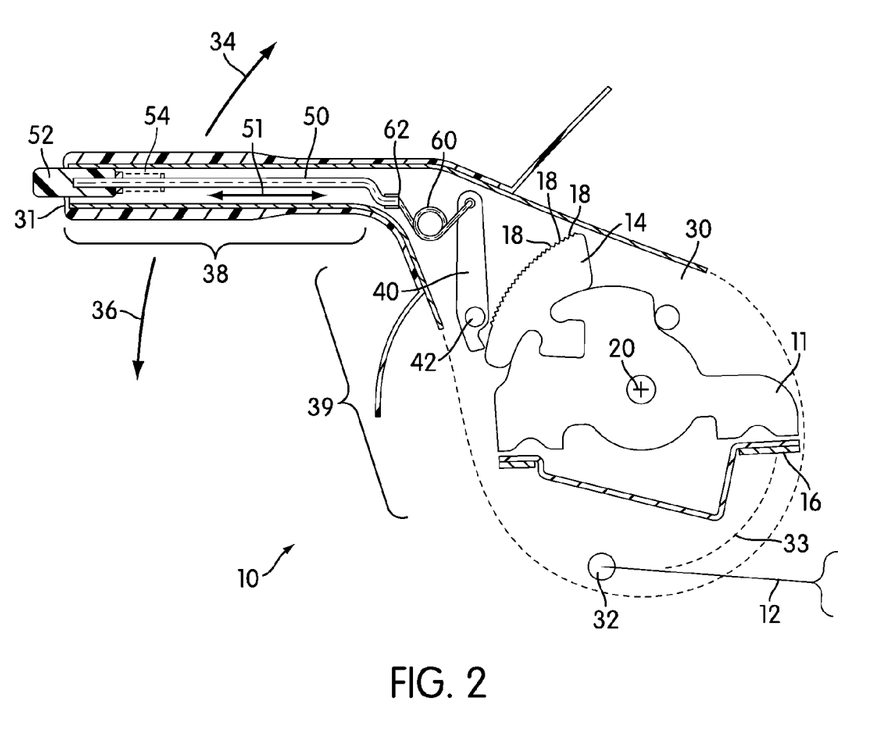
FIG. 2 is a cross-sectional view illustration of the present invention with the parking brake released.

As shown in FIGS. 1 and 2, the parking brake actuating assembly 10 comprises a mounting structure in the form of a mounting bracket 11 that fixedly mounts to the floor pan 16 of the vehicle 80 within its passenger compartment 84. A stationary sector 14 is fixedly mounted to the bracket 11. The stationary sector 14 has a plurality of teeth 18 arranged along an arc centered at a pivot axis 20.

A brake lever 30 is mounted for pivotal movement relative to the sector 14 about the pivot axis 20. The brake lever 30 is operatively connected to an engagement portion 32, which comprises a take-up reel 33 with a groove designed to accommodate the brake cable 12. The brake cable 12 is mounted to the engagement portion 32. The take-up reel 33 may be fixed to the brake lever 30 or be an integral part of the brake lever 30. Alternatively, the take-up reel 33 may be rotated relative to the brake lever 30 by an adjusting spring to take up slack in the brake cable 12. When the brake lever is rotated in a brake applying direction 34 (clockwise as shown in FIG. 2) to a braking position (shown in FIGS. 3 and 4), tension is applied to the vehicle brake cable 12 such that the parking brakes of the vehicle are engaged. Conversely, when the brake lever 30 is rotated in a brake releasing direction 36 (counterclockwise as shown in FIG. 2) opposite the brake applying direction 34 to a released position (shown in FIG. 2), the tension in the vehicle brake cable 12 is relieved to release the vehicle parking brakes.

To enable a user to easily grasp and rotate the brake lever 30, a narrow handle portion 38 is disposed at an outer end of the brake lever 30. The narrow handle portion 38 is narrow enough that users can easily wrap their hands around the handle portion 38 to operate the brake actuator 10. The handle portion 38 extends generally away from the pivot axis 20. The handle portion 38 is covered with a molded plastic or rubber exterior, which provides a comfortable hand grip for the user.

A pawl-receiving portion 39 of the brake lever 30 is sufficiently wider than the handle portion 39 to provide ample space to accommodate actuator components therein, as will be described below. The pawl-receiving portion 39 extends from an inner end of the handle portion 38 to the sector 14, the width of the pawl-receiving portion 39 expanding from the inner end of the handle portion 38 to the sector 14.

A pawl 40 is mounted to the brake lever 30 within the pawl-receiving portion 39 for movement between engaged and disengaged positions relative to the teeth 18. The pawl 40 is preferably pivotably mounted to the brake lever 30 by a pivot pin or rivet at a pivot axis 42. When the pawl 40 is in the engaged position and the brake lever 30 is in the braking position, the pawl 40 and teeth 18 function in a ratcheting relationship to prevent the brake lever 30 from pivoting in the brake releasing direction 36 while allowing the brake lever 30 to pivot in the brake applying direction. Conversely, when the pawl 40 is in the disengaged position, the pawl 40 does not engage the teeth 18 and the brake lever 30 is allowed to rotate in either direction. The pawl-receiving portion 39 provides ample space for the pawl 40 to move between the engaged and disengaged positions.

Figure 3:
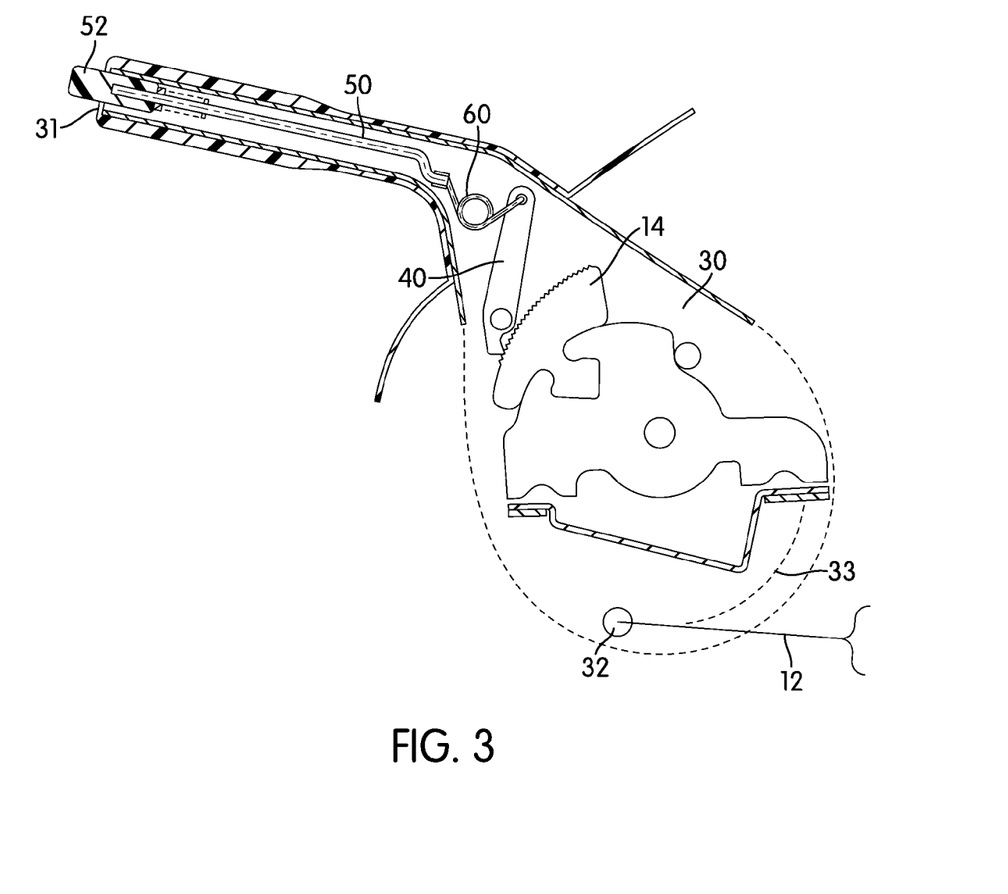
FIG. 3 is a cross-sectional view illustration of the present invention with the parking brake engaged and the release member in the normal position.
Figure 4:
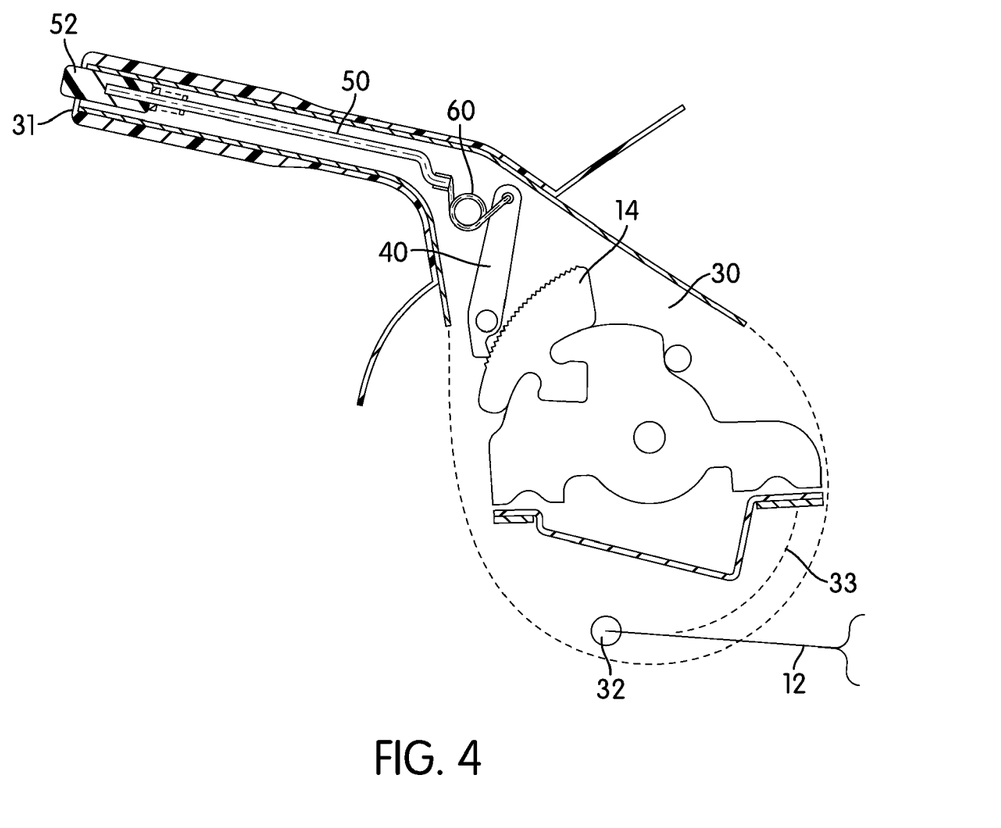
FIG. 4 is a cross-sectional view illustration of the present invention with the parking brake engaged and the release member in the depressed position.

An elongated release member 50 is mounted to the brake lever 30 for longitudinal movement relative to the brake lever 30 in the directions of the arrows 51 in FIG. 2 between a normal position (shown in FIGS. 2 and 3) and a depressed position (shown in FIG. 4). A spring 54, which is disposed between the release member 50 and the brake lever 30, urges the release member 50 toward the normal position. The release member 50 spans at least a substantial longitudinal length of the narrow handle portion 38 of the brake lever 30.

The release member 50 includes an activation portion 52, which is disposed at an outer longitudinal end of the release member 50 and protrudes out of the outer longitudinal end of the brake lever 30. The activation portion 52 is designed to be pushed inward by a user to operate the parking brake actuator 10 such that manually depressing the activation portion 52 forces the release member 50 to move from the normal position thereof to the depressed position thereof. The activation portion 52 is preferably a molded plastic button.

The release member 50 is substantially rigid in order to effectively transfer a motion from the activation portion 52 to the inner end of the release member 50 when a user depresses the activation portion 52. To possess this substantial rigidity, the release member is preferably made of a metal such as steel. The release member 50 is preferably a cylindrical rod, but may have any other cross-section or configuration.

A resilient motion-absorbing member in the form of a metallic motion-absorbing spring 60 is provided. The spring 60 operatively connects an inner end of the release member 50 to the pawl 40. An outer end of the motion-absorbing spring 60 connects directly to the inner end of the release member 50 (i.e. no other substantial components such as springs or extension rods are disposed therebetween). Consequently, the motion-absorbing spring 60 is spaced inwardly from the activation portion 52, which is disposed at the outer end of the release member 50, by approximately the length of the release member 50. An inner end of the motion-absorbing spring 60 connects directly to the pawl 40. By positioning the motion-absorbing spring 60 between the release member 50 and the pawl 40, manufacture and assembly of the brake actuator is simplified in comparison to the design disclosed in the '425 patent. Instead of placing the spring 60 within the narrow handle portion 38, it is substantially disposed within the pawl-receiving portion 39 of the brake lever 30, where there are fewer space constraints, thus further simplifying assembly.

As shown in FIG. 2, because the motion-absorbing spring 60 is substantially disposed in the pawl-receiving portion 39 of the brake lever 30, an outermost portion 62 of the motion-absorbing spring 60 according to this embodiment is positioned away from the pivot axis 20 of the brake lever 30 by less than two thirds of a distance between the pivot axis 20 and an outermost portion 31 of the brake lever 30 when the release member 50 is in the normal position.

The motion-absorbing spring 60 serves a dual purpose. When the release member 50 is in the normal position, the motion-absorbing spring 60 is in slight tension so as to urge the pawl 40 to remain in the engaged position. When the release member 50 is in the depressed position, the motion-absorbing spring 60 is compressed and in turn urges the pawl 40 to move into the disengaged position. Alternatively, the design could be such that the spring is relaxed when the release member 50 is in its normal position.

While the motion-absorbing spring 60 illustrated in FIG. 2 is a torsion spring, other types of springs or combinations of springs could also be used without departing from the scope of the invention. For example, a compression spring, which would function as the motion-absorbing spring, could be disposed between the release member 50 and the pawl 40 while a separate spring could be used to bias the pawl 40 toward the engaged position.

The motion-absorbing spring 60 may be composed of any suitable elastically deformable material. Because the release member 50 is composed of a substantially rigid material and the motion-absorbing spring 60 is composed of an easily elastically deformable material, the release member 50 and the motion-absorbing spring 60 will be primarily composed of different materials.

In addition, other motion absorbing structures such as a non-metallic spring in the form of a rubber grommet may be used for the same purpose as spring 60. The rubber grommet provides the added advantage of a reduction in noise by avoiding any metal to metal contact from metallic springs.

Hereinafter, the operation of the brake actuator will be described.

FIG. 2 shows the parking brake actuator 10 with the parking brake released. To apply the parking brake, a user grips the narrow handle portion 38 of the brake lever 30 and rotates it in the brake applying direction 34 into the braking position, as shown in FIG. 3. During this movement, the pawl 40 ratchets over the sector teeth 18. The pawl 40 engages the teeth 18 and prevents the brake lever 30 from thereafter rotating back in the brake releasing direction 36. It should be noted that there are numerous braking positions, each of which corresponds to an engagement between the pawl 40 and one of the teeth 18 of the sector 14. When the brake lever 30 is in the braking position, the vehicle brake cable 12 is tensioned and exerts a reaction force on the brake lever 30 urging the brake lever 30 to rotate in the releasing direction. When engaged, the pawl 40 prevents the brake lever 30 from rotating in the releasing direction 36. This in turn forces the pawl 40 into binding engagement with the sector teeth 18.

FIG. 4 illustrates a situation in which the activation portion 52 is depressed and the brake lever 30 is in the braking position. Depressing the activation portion 52 moves the release member 50 into the depressed position, which, in turn, compresses the motion-absorbing spring 60, which, in turn, urges the pawl 40 toward the disengaged position. However, the cable tension load binding the pawl 40 with the sector teeth 18 is greater than the disengaging force of the motion-absorbing spring 60 such that the pawl 40 remains in the engaged position and the parking brake is not released. As a result, the spring 60 is simply compressed without the pawl 40 being moved from its engaged position into its disengaged position.

To move the brake lever 30 into its brake released position, the user rotates the brake lever 30 slightly in the brake applying direction 34 to relieve the cable tension load from the pawl 40. Then, the user manually depresses the activation portion 52 to affect longitudinal movement of the release member 52. This movement is transferred through the spring 60 to move the pawl 40 into the disengaged position thereof, after which the user may release the brake by letting the brake lever 30 rotate in the releasing direction 36 until brake lever 30 reaches the released position.

Consequently, the parking brake may only be released by both lifting the brake lever 30 slightly in the brake applying direction 34 and depressing the activation portion 52. This reduces the likelihood that the lever 30 will be unintentionally released because it is unlikely that both prerequisite conditions will unintentionally occur. When only one of the prerequisite conditions occurs (i.e. the activation portion 52 is depressed or the brake lever 30 is rotated slightly in the brake applying direction 34), the brake will not be released.

Figure 5:
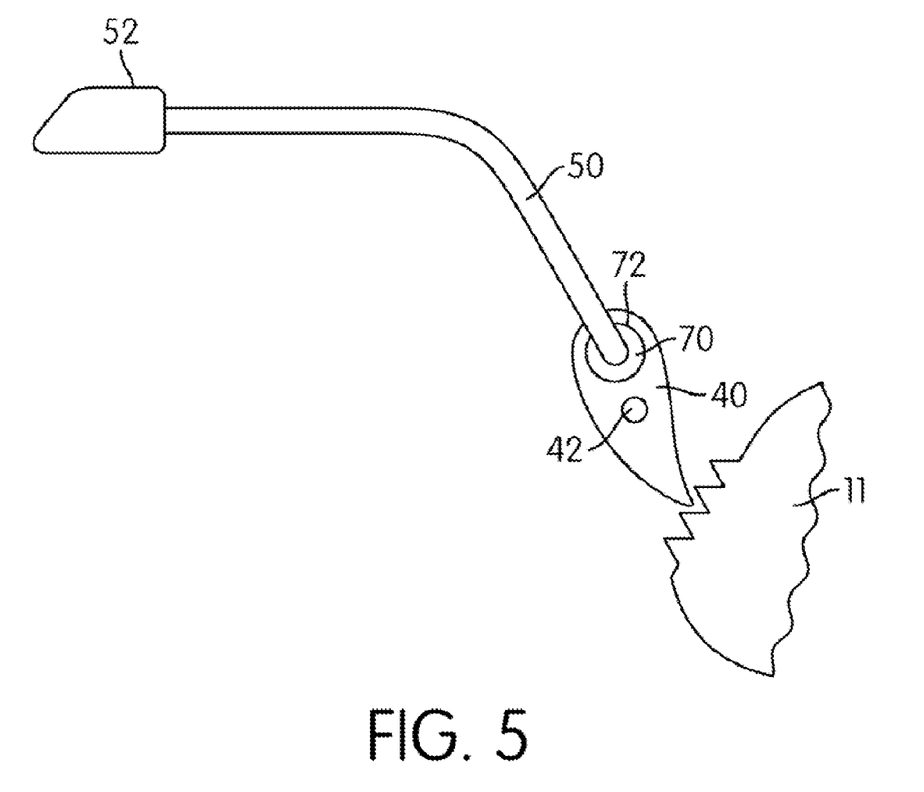
FIG. 5 is a side view illustration of another embodiment of the present invention.

FIG. 5 illustrates another embodiment of the invention in which rubber grommet 70 is used to perform the function of motion-absorbing spring 60 as illustrated and described in relation to FIGS. 2-4. The grommet 70 is mounted within an opening formed through the pawl 40. The grommet 70 also has an inner opening, and the inner end of the rod 50 is bent at a 90 degree angle and extends therethrough to operatively connect the rod 50 to the grommet 70 and the pawl 40. The rubber grommet 70 will compress if the handle portion 38 is not lifted and the button 52 is pressed. Conversely if the handle 38 is raised to take the cable load off pawl 40, pressing button 52 will cause the rod 50 to move the pawl by transferring force through the grommet. The use of rubber in the motion absorbing element provides the additional advantage of a reduction in noise from the case when a metallic spring is used as a motion absorbing element. The grommet 70 also has an outermost portion located at reference number 72.

The foregoing illustrated embodiments have been provided to illustrate the structural and functional principles of the present invention and is not intended to be limiting. To the contrary, the principles of the present invention are intended to encompass any and all changes, alterations and/or substitutions within the spirit and scope of the following claims.

What is claimed is:

1. A parking brake actuating assembly for installation in a passenger compartment of a motor vehicle, the motor vehicle having a brake system that is actuated to prevent vehicle wheel rotation and hence rolling movement of the vehicle by applying tension to a vehicle brake cable that connects to the brake system, the parking brake actuating assembly comprising:

a mounting structure mountable to the motor vehicle;

a stationary sector carried by the mounting structure and having a plurality of teeth;

a brake lever mounted for pivotal movement relative to the sector and adapted to be operatively connected to the vehicle brake cable, the brake lever being pivotable (a) in a brake applying direction to a braking position to apply tension to the vehicle brake cable and (b) in a brake releasing direction opposite the brake applying direction to a released position to relieve tension on the vehicle brake cable;

a pawl mounted to the brake lever for movement between (a) an engaged position wherein the pawl engages the teeth of the sector to prevent the brake lever from pivoting in the brake releasing direction when the brake lever is in the braking position, and (b) a disengaged position wherein the pawl is disengaged from the teeth to allow the brake lever to pivot from the braking position thereof towards and into the released position thereof;

an elongated rigid release member mounted to the brake lever for longitudinal movement relative to the brake lever between normal and depressed positions, the release member having an outer activation portion that extends exteriorly of the brake lever such that manually depressing the activation portion moves the release member from the normal position to the depressed position; and a resilient motion-absorbing member spaced inwardly from the activation portion and operatively connecting the release member to the pawl, the motion-absorbing member being constructed such that, when the brake lever is operatively connected to the vehicle brake cable and moved to the braking position thereof with the pawl in the engaged position thereof, (a) moving the brake lever in the brake applying direction to relieve a cable tension load from the pawl and manually moving the release member to the depressed position thereof transfers force to the pawl through the motion-absorbing member such that said force moves the paw from the engaged position thereof to the disengaged position thereof via the motion-absorbing member, and (b) moving the release member to the depressed position thereof without also moving the brake lever in the brake applying direction to relieve the cable tension load compresses the motion-absorbing member without moving the pawl from the engaged position thereof.

2. The parking brake actuating assembly of claim 1, wherein the release member spans at least a majority of a longitudinal portion of a narrow handle portion of the brake lever.

3. The parking brake actuating assembly of claim 1, wherein the brake lever comprises (a) an outer narrow handle portion extending generally away from a pivot axis of the brake lever and (b) a pawl-receiving portion proximate the sector, the pawl being received in the pawl-receiving portion and the motion-absorbing member being substantially disposed in the pawl-receiving portion between the pawl and an inner end of the release member.

4. The parking brake actuating assembly of claim 1, wherein an outermost portion of the motion-absorbing member is positioned away from a pivot axis of the brake lever by less than two thirds of a distance between the pivot axis and an outermost portion of the brake lever.

5. The parking brake actuating assembly of claim 1, further comprising a release-member-biasing spring disposed between the brake lever and the release member, the release-member-biasing spring applying a biasing force to the release member that urges the release member into the normal position.

6. The parking brake actuating assembly of claim 5, wherein the release-member-biasing spring is a compression spring.

7. The parking brake actuating assembly of claim 1, wherein the motion-absorbing member urges the pawl toward the engaged position when the release member is in the normal position.

8. The parking brake actuating assembly of claim 1, wherein the motion-absorbing member is metallic.

9. The parking brake actuating assembly of claim 8, wherein the metallic motion-absorbing member is a torsion spring.

10. The parking brake actuating assembly of claim 1, wherein the motion-absorbing member is non-metallic.

11. The parking brake actuating assembly of claim 10, wherein the non-metallic motion-absorbing member is a rubber grommet.

12. The parking brake actuating assembly of claim 1, wherein the teeth of the sector are arranged along an arc centered at a pivot axis of the brake lever.

13. The parking brake actuating assembly of claim 1, wherein the pawl is pivotably mounted to the brake lever.

14. The parking brake actuating assembly of claim 1, wherein the release member comprises a rod.

15. The parking brake actuating assembly of claim 1, wherein the release member and the motion-absorbing member are composed of different materials.

16. The parking brake actuating assembly of claim 1, wherein the motion-absorbing member is connected directly to the pawl.

17. The parking brake actuating assembly of claim 1, wherein the motion-absorbing member is connected directly to an inner end of the release member.

18. A vehicle comprising:

a passenger compartment, a brake system having a brake cable connected thereto, the brake system being actuated to prevent vehicle wheel rotation and hence rolling movement of the vehicle by applying tension to the vehicle brake cable; and a parking brake actuating assembly comprising:

a mounting structure mounted to the vehicle;

a stationary sector carried by the mounting structure and having a plurality of teeth;

a brake lever mounted for pivotal movement relative to the sector and operatively connected to the vehicle brake cable, the brake lever being pivotable (a) in a brake applying direction to a braking position to apply tension to the vehicle brake cable and (b) in a brake releasing direction opposite the brake applying direction to a released position to relieve tension on the vehicle brake cable;

a pawl mounted to the brake lever for movement between (a) an engaged position wherein the pawl engages the teeth of the sector to prevent the brake lever from pivoting in the brake releasing direction when the brake lever is in the braking position, and (b) a disengaged position wherein the pawl is disengaged from the teeth to allow the brake lever to pivot from the braking position thereof towards and into the released position thereof;

an elongated, rigid release member mounted to the brake lever for longitudinal movement relative to the brake lever between normal and depressed positions, the release member having an outer activation portion that extends exteriorly of the brake lever such that manually depressing the activation portion moves the release member from the normal position to the depressed position; and a resilient motion-absorbing member spaced inwardly from the activation portion and operatively connecting the release member to the pawl, the motion-absorbing member being constructed such that, when the brake lever is moved to the braking position thereof with the pawl in the engaged position thereof, (a) moving the brake lever in the brake applying direction to relieve a cable tension load from the pawl and manually moving the release member to the depressed position thereof transfers force to the pawl through the motion-absorbing member such that said force moves the pawl from the engaged position thereof to the disengaged position thereof via the motion-absorbing member, and (b) moving the release member to the depressed position thereof without also moving the brake lever in the brake applying direction to relieve the cable tension load compresses the motion-absorbing member without moving the pawl from the engaged position thereof.

19. The vehicle of claim 18, wherein the release member spans at least a majority of longitudinal portion of a narrow handle portion of the brake lever.

20. The vehicle of claim 18, wherein the brake lever comprises (a) an outer narrow handle portion extending generally away from a pivot axis of the brake lever and (b) a pawl-receiving portion proximate the sector, the pawl being received in the pawl-receiving portion and the motion-absorbing member being substantially disposed in the pawl-receiving portion between the pawl and an inner end of the release member.

21. The vehicle of claim 18, wherein an outermost portion of the motion-absorbing member is positioned away from a pivot axis of the brake lever by less than two thirds of a distance between the pivot axis and an outermost portion of the brake lever.

22. The vehicle of claim 18, further comprising a release-member-biasing spring disposed between the brake lever and the release member, the release-member-biasing spring applying a biasing force to the release member that urges the release member into the normal position.

23. The vehicle of claim 22, wherein the release-member-biasing spring is a compression spring.

24. The vehicle of claim 18, wherein the motion-absorbing member urges the pawl toward the engaged position when the release member is in the normal position.

25. The vehicle of claim 18, wherein the motion-absorbing member is metallic.

26. The vehicle of claim 25, wherein the metallic motion-absorbing member is a torsion spring.

27. The vehicle of claim 18, wherein the motion-absorbing member is non-metallic.

28. The vehicle of claim 27, wherein the non-metallic motion-absorbing member is a rubber grommet.

29. The vehicle of claim 18, wherein the teeth of the sector are arranged along an arc centered at a pivot axis of the brake lever.

30. The vehicle of claim 18, wherein the pawl is pivotably mounted to the brake lever.

31. The vehicle of claim 18, wherein the release member comprises a rod.

32. The vehicle of claim 18, wherein the release member and the motion-absorbing member are composed of different materials.

33. The vehicle of claim 18, wherein the motion-absorbing member is connected directly to the pawl.

34. The vehicle of claim 18, wherein the motion-absorbing member is connected directly to an inner end of the release member.

* * * * *

UNITED STATES PATENT AND TRADEMARK OFFICE
CERTIFICATE OF CORRECTION

| | | |
|---|---|---|
| PATENT NO. | : 7,658,126 B2 | Page 1 of 1 |
| APPLICATION NO. | : 11/132253 | |
| DATED | : February 9, 2010 | |
| INVENTOR(S) | : Revelis et al. | |

It is certified that error appears in the above-identified patent and that said Letters Patent is hereby corrected as shown below:

In column 8, line 3, change "paw" to -- pawl --.

Signed and Sealed this

Sixth Day of April, 2010

David J. Kappos
*Director of the United States Patent and Trademark Office*